United States Patent

[11] 3,627,227

| [72] | Inventor | Sanford W. Foor<br>Rochester, N.Y. |
|---|---|---|
| [21] | Appl. No. | 872,572 |
| [22] | Filed | Oct. 30, 1969 |
| [45] | Patented | Dec. 14, 1971 |
| [73] | Assignee | Eastman Kodak Company<br>Rochester, N.Y. |

[54] LIGHTTIGHT FILM MAGAZINE
9 Claims, 4 Drawing Figs.

[52] U.S. Cl. .................................................. 242/197,
242/71.7, 352/75
[51] Int. Cl. ...................................................... G03b 1/04,
G11b 15/32, G11b 23/04
[50] Field of Search .......................................... 242/197–200,
71.7, 192; 352/72–78

[56] References Cited
UNITED STATES PATENTS
| 1,317,404 | 9/1919 | Thomas .................. | 242/192 X |
| 2,374,038 | 4/1945 | Ress ..................... | 242/192 |
| 2,979,277 | 4/1961 | Page et al. ............... | 242/208 X |

*Primary Examiner*—Leonard D. Christian
*Attorneys*—Robert W. Hampton and Steve W. Gremban ABSTRACT: A lighttight film magazine for use with a film receptor, such as a processor or the like, having one or more pressure rollers engageable with a film spool mounted in the magazine to accomplish one or more of the following functions, namely (1) controlling axial movement of the spool, (2) imposing the required frictional drag on the spool to control film tension, and (3) sensing film spool rotation and film transport to the film receptor. The magazine has a light-lock mechanism at the magazine exit movable from a normally closed, light-locked position to an open position by cooperating apparatus on the film receptor when the magazine is mounted thereon. When unmounted, a cam mechanism on the magazine moves the pressure roller to a spool disengaged position, and the light-lock mechanism to its open position to permit loading of the magazine.

SANFORD W. FOOR
INVENTOR.

PATENTED DEC 14 1971

3,627,227

SANFORD W. FOOR
INVENTOR.

BY Steve W. Greenbaum
Robert W. Hampton
ATTORNEYS

LIGHTTIGHT FILM MAGAZINE

BACKGROUND OF THE INVENTION

1. Field of the Invention

This invention relates generally to film magazines, and more specifically to a lighttight film supply magazine for a film receptor such as a film processor or the like.

2. Description of the Prior Art

It is known to transfer an exposed film from a camera film spool or cassette to a lighttight film magazine in a dark room. The magazine may then be installed in normal room light on a film receptor such as a film processor or the like.

Normally, a leader or self-threader is spliced in the dark room to the leading end of the exposed film in the film magazine before the magazine is closed, or in the alternative a short length of film is allowed to project through the film magazine exit slit prior to closing the film magazine, and the leader attached to the film prior to mounting the magazine on the processor. During mounting of the film magazine, the leader is normally guided by guide means on the processor into the nip of a pair of processor drive rollers that withdraws the film from the film magazine and transports it through the processor. Such film magazines are normally provided with complicated mechanisms for accommodating film spools of varying widths and preventing axial movement of the spools. Such magazines normally have separate mechanisms of complicated design for imposing a frictional drag on the film spool to provide the required film tension, and for sensing film spool rotation and film advance.

SUMMARY OF THE INVENTION

This invention includes within its scope a lighttight film magazine for a film receptor such as a processor or the like having means comprising a pressure roller or rollers movable into and out of engagement with a film spool for accomplishing one or more of the following functions, namely (1) axially positioning the film spool on its shaft, (2) imposing a frictional drag on the film spool to maintain the required film tension, and (3) operating a sensing mechanism for sensing movement of the film spool, thereby indicating film advance to the film receptor. The pressure roller or rollers are movable by a cam mechanism between spool engaged and disengaged positions.

It is therefore an object of the present invention to provide a film magazine having means movable into and out of film spool engagement for accomplishing one or more of the following functions, namely (1) axially positioning the film spool on its shaft, (2) imposing a frictional drag on the film spool to maintain the required film tension, and (3) operating a sensing mechanism for sensing movement of the film spool and film.

The invention and its objects and advantages will become more apparent from the detailed description of the preferred embodiment presented below.

BRIEF DESCRIPTION OF THE DRAWING

In the detailed description of the preferred embodiment of the invention presented below, reference is made to the accompanying drawings, in which.

DESCRIPTION OF THE PREFERRED EMBODIMENT

Figure 1:
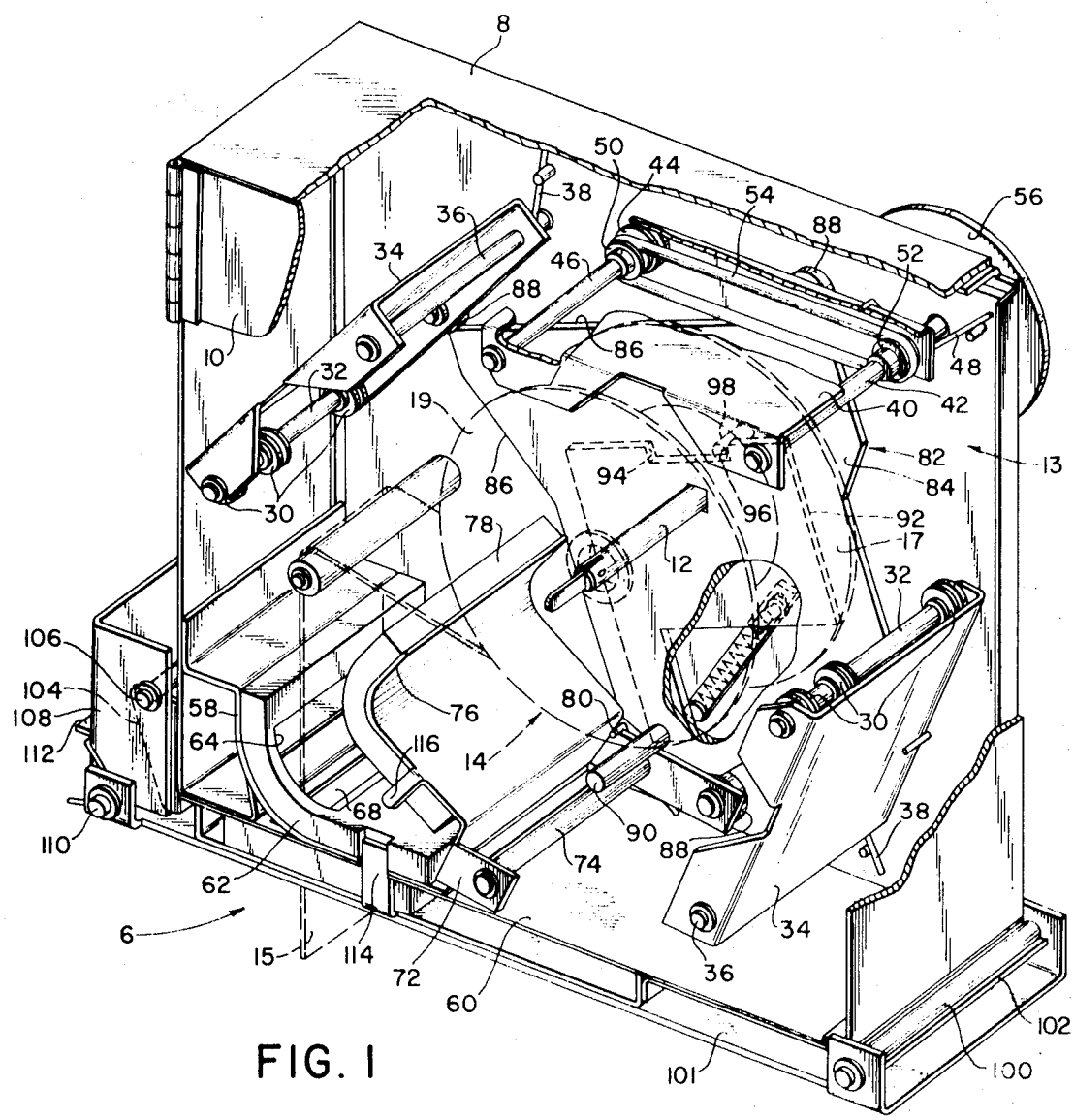
FIG. 1 is a perspective view of the lighttight film magazine of this invention showing the magazine in a film spool loading position, with parts broken away for clarity of illustration.

Because film magazines and receptors such as film processors are well known, the present description will be directed in particular to elements forming part of or cooperating more directly with the present invention, film magazine and processor elements not specifically shown or described herein being understood to be selectable from those known in the art.

With reference to the drawings, a film magazine 6 of this invention is shown comprising a boxlike housing 8 having a cover plate 10 hingedly secured to one side of housing 8 to provide a lighttight magazine when closed by any suitable latch, not shown. A spindle 12 is secured to the rear wall 13 of the housing, and a film spool 14 for receiving either a 16 mm. or 35 mm. width film 15 may be rotatably mounted on the spindle.

Figure 4:
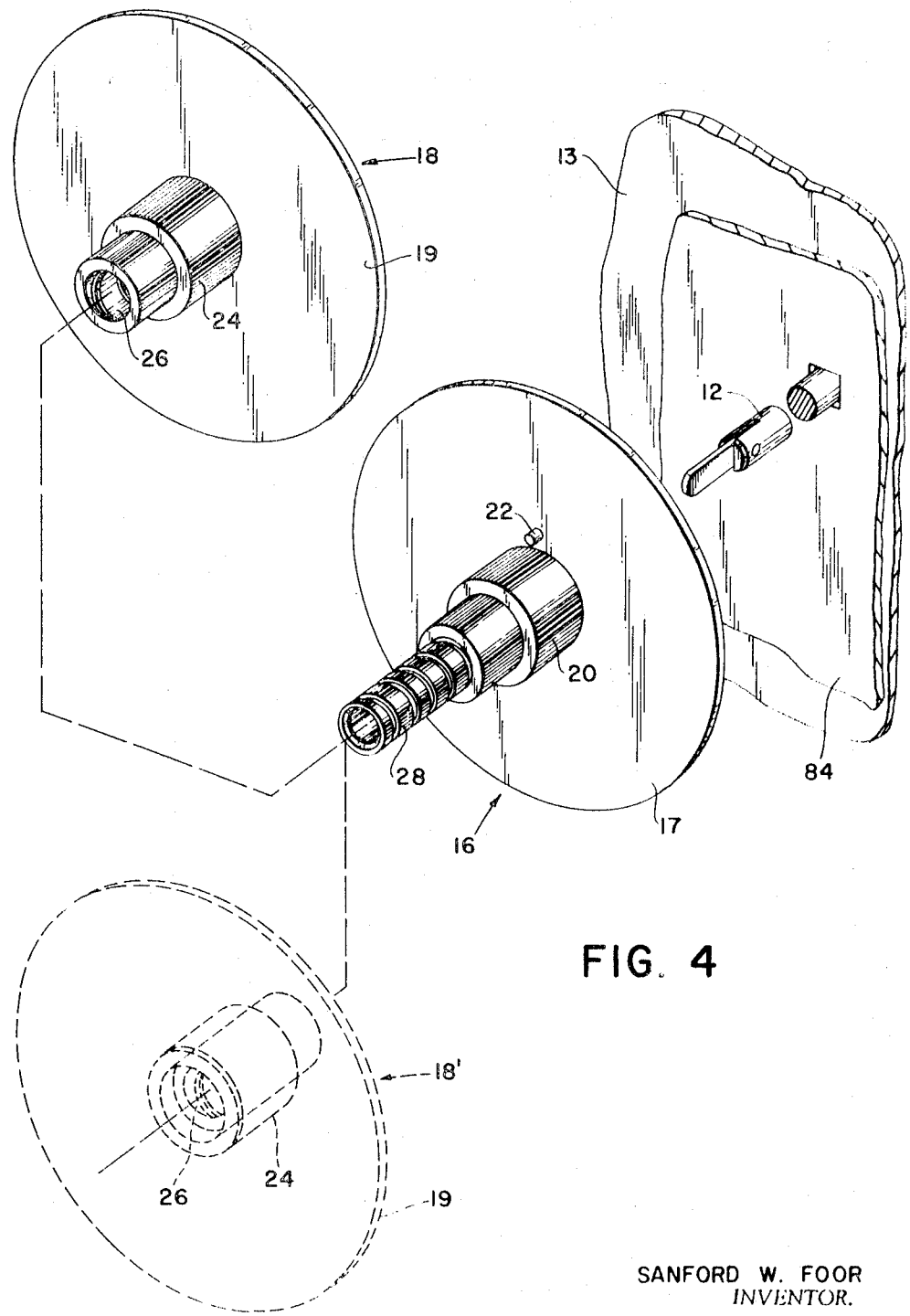
FIG. 4 is a perspective view in exploded form showing how one flange may be combined with another flange in two different ways to provide a film spool for supporting film of two different widths.

Film spools 14 having film to be processed of two predetermined widths such as 16 mm. or 35 mm. film widths may be directly mounted on the magazine spindle. Films that are wound on cores rather than film spools must be transferred to special spools which are then mounted on film magazine spindle 12. As best seen in FIG. 4, two spool members 16, 18 are provided which are adapted to be secured together in one of two ways to support a film of 16 mm. or 35 mm. width. The spool member 16 nearest the rear wall 13 of magazine 6 is provided with a flange 17 and a cylindrical hub 20 which enters the center hole of a 16 mm. or 35 mm. core, not shown, and has a drive pin 22 to engage the webbing of either size core to secure the core to the member. The spool member 18 nearest the door 10 of the magazine has a flange 19 and an axially extending hub 24 having a threaded inner periphery 26 that meshes with a threaded shaft 28 on hub 20 of spool member 16. When the spool members 16, 18 are secured together with the hub 24 of member 18 extending away from member 16 as seen in full lines near the top of FIG. 4, the two members 16, 18 cooperate to form a film spool for supporting a film 15 having a width of 16 mm., for example. When the two spool members 16, 18 are secured together with the members reversed so that the hub 24 of member 18 is extending toward member 16 as seen in broken lines and designated 18′ near the bottom of FIG. 4, the two members 16, 18′ cooperate to form a film spool for supporting a film 15 having a width of 35 mm., for example.

Any film spool 14 mounted on spindle 12 is retained on the spindle in a predetermined axial position by grooved retaining rollers 30 on shaft 32 rotatably mounted at one end of U-shaped brackets 34 mounted for pivotal movement on shaft 36 secured to wall 13 of housing 8. The brackets 34 are urged by springs 38 into a flange engaged position in which the grooved retaining rollers 30 are urged into peripheral engagement with one or more of the flanges 17, 19 of the film spool. Three such retaining rollers 30 are supported on shaft 32 and are axially spaced apart with one roller engaging the innermost flange 17, the center roller engaging the outer flange 19 of a spool of one width such as 16 mm., and the outermost roller engaging the outer flange 19 of a spool of a different width such as 35 mm.

The film magazine 8 has a film spool sensing and indicator mechanism comprising a U-shaped bracket 40 having one end pivotally mounted on a shaft 42 journaled for rotation in wall 13 of housing 8. A rubber-covered sensing wheel 44 is secured to a rotatable shaft 46 at the opposite end of bracket 40, and is engageable with the outer periphery of the innermost flange 17 of the film spool 14. The bracket 40 is provided with a torsion spring 48 for pivoting bracket 40 around shaft 42 and urging wheel 44 into engagement with flange 17. The shaft 46 has a pulley 50 secured thereto for driving a pulley 52 secured to shaft 42 via a drive belt 54 trained over pulleys 50, 52. An indicator disk 56 is secured to the end of shaft 42 extending through wall 13 of housing 8 and visible from the outside of magazine 6, and any movement of film spool 14 resulting from transport of film 15 will drive indicator disk 56 by virtue of wheel 44, pulleys 50, 52 and belt 54. Although a pair of brackets 34 with retaining rollers 30 are shown for engaging diametrically opposed portions of flanges 17, 19, and a single bracket 40 with a sensing wheel 44, it is within the scope of this invention to achieve the spool retaining and sensing functions with a single properly designed bracket and rollers.

Figure 2:
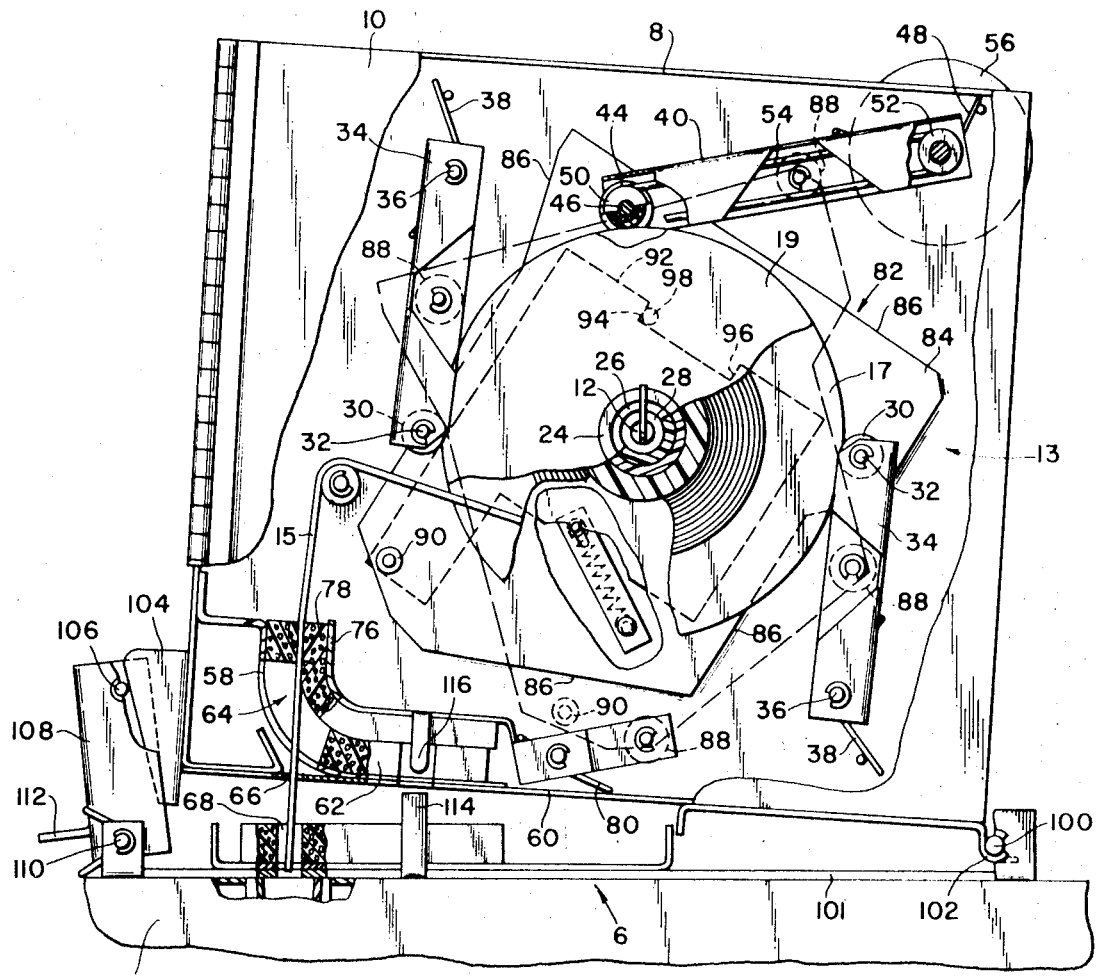
FIG. 2 is a side elevational view of the film magazine of FIG. 1 showing the magazine in a film spool loaded position, with parts broken away for clarity of illustration.

A light lock mechanism at the exit of magazine 6 as best seen in FIG. 2 comprises an arcuate plate 58 mounted on the base 60 of the magazine. A light-lock pad 62 formed from some suitable form material such as polyurethane foam is secured to plate 58. The plate 58 and pad 62 have an opening 64 therethrough in alignment with an exit slit 66 in base 60 and an entry slot 68 in a processor 70. A light-lock arm 72 pivotally mounted on shaft 74 secured to wall 13 has a curved portion 76 complimentary to arcuate plate 58 and covered by some suitable foam material 78. The arm 72 is normally urged by a torsion spring 80 into a closed position in light-lock engagement with pad 62 for covering the exit slit 66.

Figure 3:
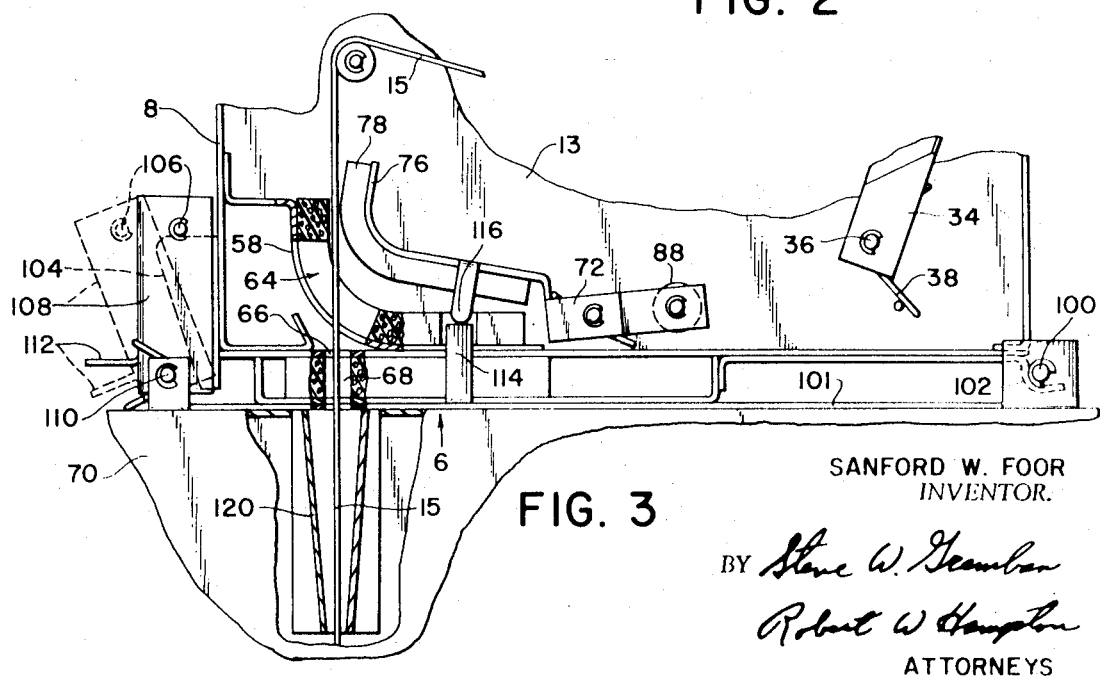
FIG. 3 is a segmental, side elevational view of the film magazine of FIG. 2 mounted on a film receptor.

The magazine 6 further has cam means 82 as best seen in FIG. 2 for moving the retaining and sensing arms 34, 40 respectively between their flange disengaged and engaged positions, and the light-lock arm 72 between its open and closed positions. The cam means 82 comprises a cam plate 84 rotatably mounted on wall 13 about spindle 12 and having cam surfaces 86 for engaging cam follower rollers 88 mounted on each of the arms. The cam plate 84 is manually rotatably movable by a handle 90 laterally extending therefrom, and such rotatable movement of the cam plate is limited between two stop positions by a stop plate 92 secured to cam plate 84 and having a pair of spaced shoulders 94, 96 engageable with a stop pin 98 on the housing. An overcenter expansion spring mechanism is provided for holding cam plate 84 in one or the other of the two stop positions. Placement of cam plate 84 by handle 90 into the stop position seen in FIG. 1 causes cam surfaces 86 to engage cam follower rollers 88 mounted on brackets 34, 40 and arm 72 for moving rollers 30 to their flange disengaged positions, and light-lock arm 72 to its open position. In this position, a film spool 14 of exposed film may be loaded on spindle 12. Manual movement of cam plate 84 by handle 90 to the stop position seen in FIG. 2 causes rollers 30 to be moved to their flange engaged positions, and light-lock arm 72 to be moved to its closed position preventing the entry of light into magazine 6 through exit slit 66. The magazine is now fully loaded and may be carried by a carrying handle, not shown, from the dark room into a lighted room where it may be mounted on processor 70 or the like, only a portion of which is shown. The processor 70 is provided with a magazine support mechanism as best seen in FIG. 2 and 3 having a fixed holddown shaft 100 spaced from a support plate 101 to provide a slot into which a bent holddown clip 102 secured to one end of bottom wall 60 of the magazine may be inserted. At the opposite end of wall 60, a nose-shaped cam 104 is secured to the adjacent sidewall and is adapted when magazine 6 is moved into its latched position on support plate 101 as seen in FIG. 3 to engage a cam follower lug 106 on a latch lever 108 pivoted at 110 and cam the lever outwardly against the bias of a spring 112. The lever 108 is returned to its normal position as lug 106 moves along the end of cam 104 and into the path of the cam for releasably latching magazine 6 onto support plate 101. The support plate further has a rigid light-lock release post 114 for engaging a push rod 116 on light-lock arm 72 and urging the arm to its open position. The lead end of the film 15 extending through exit slit 66 of the magazine is directed by guide means 120 into the nip of the first pair of drive rollers, not shown, of processor 70.

The invention has been described in detail with particular reference to a preferred embodiment thereof, but it will be understood that variations and modifications can be effected within the spirit and scope of the invention as described hereinabove.

I claim:

1. In a film magazine for rotatably supporting a film spool, the combination comprising:
    first means movable from a position disengaged from the film spool to a position in engagement with the film spool for (1) axially positioning the film spool in the magazine, (2) imposing a frictional drag on the film spool, and (3) sensing and indicating movement of the film spool; and
    means for moving said first means between its film spool disengaged and engaged positions.

2. The invention according to claim 1 wherein said first means comprises a roller, and means for urging said roller into engagement with the film spool.

3. The invention according to claim 1 wherein the film spool has a flange, and said first means comprises a grooved roller and means for urging said roller into engagement with the periphery of the flange.

4. The invention according to claim 3 wherein said roller is rotatably mounted on an arm, and said moving means comprises a cam for engaging and moving said arm.

5. The invention according to claim 1 wherein the film spool has a pair of axially spaced flanges, and said first means comprises an arm and a plurality of axially spaced grooved rollers mounted for rotation on a shaft supported by said arm, and means for urging said rollers into engagement with the flanges.

6. The invention according to claim 1 wherein the film magazine has a housing and said first means comprises a roller, an indicator member rotatably mounted on the housing and visible from the outside of the housing, and means drivingly connecting said indicator member to said roller.

7. In a lighttight film magazine for rotatably supporting a spindle onto which a film spool having axially spaced flanges is mountable, the magazine having a housing and an exit slit therein through which the film is withdrawn from the housing, the combination comprising:
    first means movable from a position disengaged from the film spool to a normal position in engagement with the film spool for (1) axially positioning the film spool on the spindle and (2) imposing a frictional drag on the spindle;
    second means movable from a position disengaged from the film spool to a normal position in engagement with the film spool for sensing and indicating movement of the film spool;
    light-lock means having at least one portion movable from an open position uncovering the exit slit to a normal closed position covering the exit slit so that light cannot enter the magazine; and
    means for substantially simultaneously moving said first means and said second means to their disengaged positions and said one portion of said light-lock means to its open position whereby the magazine is in a loading position for receiving a film spool.

8. The invention according to claim 7 wherein said first means comprises a grooved roller mounted on a pivotally mounted arm and means for urging said grooved roller into engagement with the periphery of at least one of the spool flanges, said second means comprises a wheel mounted on a pivotally mounted lever and means for urging said wheel into engagement with the periphery of at least one of the spool flanges, said second means further comprises an indicator member rotatably mounted on the magazine housing and visible from the outside of the housing and means drivingly connecting said indicator member to said wheel, and said moving means comprises a cam for engaging and moving said arm, said lever and said one portion of said light-lock means.

9. The invention according to claim 8 wherein said arm has a shaft and a plurality of rollers are mounted on said shaft in axially spaced relation for respective engagement with the spool flanges.

* * * * *